United States Patent
Hinz et al.

(10) Patent No.: US 12,211,178 B2
(45) Date of Patent: Jan. 28, 2025

(54) TRANSFERRING FACES BETWEEN DIGITAL IMAGES BY COMBINING LATENT CODES UTILIZING A BLENDING NETWORK

(71) Applicant: Adobe Inc., San Jose, CA (US)

(72) Inventors: Tobias Hinz, Ulm (DE); Shabnam Ghadar, Menlo Park, CA (US); Richard Zhang, Great Falls, VA (US); Ratheesh Kalarot, San Jose, CA (US); Jingwan Lu, Santa Clara, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 383 days.

(21) Appl. No.: 17/660,090

(22) Filed: Apr. 21, 2022

(65) Prior Publication Data

US 2023/0342893 A1     Oct. 26, 2023

(51) Int. Cl.
*G06T 5/50*     (2006.01)
*G06T 11/60*    (2006.01)
*G06V 10/82*    (2022.01)

(52) U.S. Cl.
CPC ............... *G06T 5/50* (2013.01); *G06T 11/60* (2013.01); *G06V 10/82* (2022.01); *G06T 2207/20221* (2013.01); *G06T 2207/30201* (2013.01)

(58) Field of Classification Search
CPC . G06T 5/50; G06T 11/60; G06T 2207/20221; G06T 2207/30201; G06T 5/60; G06T 2207/20081; G06T 2207/20084; G06T 11/00; G06V 10/82; G06V 40/161
See application file for complete search history.

(56) References Cited

U.S. PATENT DOCUMENTS 11,688,100 B1 * 6/2023 Sun .................. H04N 23/45
                                                        382/156
2023/0162320 A1 * 5/2023 Song ................. G06T 5/50
                                                        382/100

FOREIGN PATENT DOCUMENTS

CN    112597239    * 4/2021
CN    113569582    * 10/2021

OTHER PUBLICATIONS

Machine translation for CN 113569582 (Year: 2021).*
Machine translation for CN 112597239 (Year: 2021).*
(Continued)

*Primary Examiner* — Qian Yang
(74) *Attorney, Agent, or Firm* — Keller Preece PLLC

(57) ABSTRACT

The present disclosure relates to systems, non-transitory computer-readable media, and methods for combining digital images. In particular, in one or more embodiments, the disclosed systems combine latent codes of a source digital image and a target digital image utilizing a blending network to determine a combined latent encoding and generate a combined digital image from the combined latent encoding utilizing a generative neural network. In some embodiments, the disclosed systems determine an intersection face mask between the source digital image and the combined digital image utilizing a face segmentation network and combine the source digital image and the combined digital image utilizing the intersection face mask to generate a blended digital image.

20 Claims, 13 Drawing Sheets

(56) References Cited

OTHER PUBLICATIONS

Zhu et al., "Barbershop: GAN-based Image Compositing using Segmentation Masks", arXiv preprint arXiv:2106.01505, 2021 (Year: 2021).*
Li, L. e. (2020). Faceshifter: Towards high fidelity and occlusion aware face swapping. CVPR.
Zhu, Y. e. (2021). One Shot Face Swapping on Megapixels. CVPR.
Kafri, O. e. (2021). StyleFusion: A Generative Model for Disentangling Spatial Segments. ArXiV.
Nirkin, Y. e. (2019). Fsgan: Subject agnostic face swapping and reenactment. ICCV.
Perov, I. e. (2020). Deepfacelab: A simple, flexible and extensible face swapping framework. ArXiV.
Zhang, R. e. (2018). The unreasonable effectiveness of deep features as a perceptual metric. CVPR.
Gatys, L. e. (2016). Image style transfer using convolutional neural networks. CVPR.

* cited by examiner

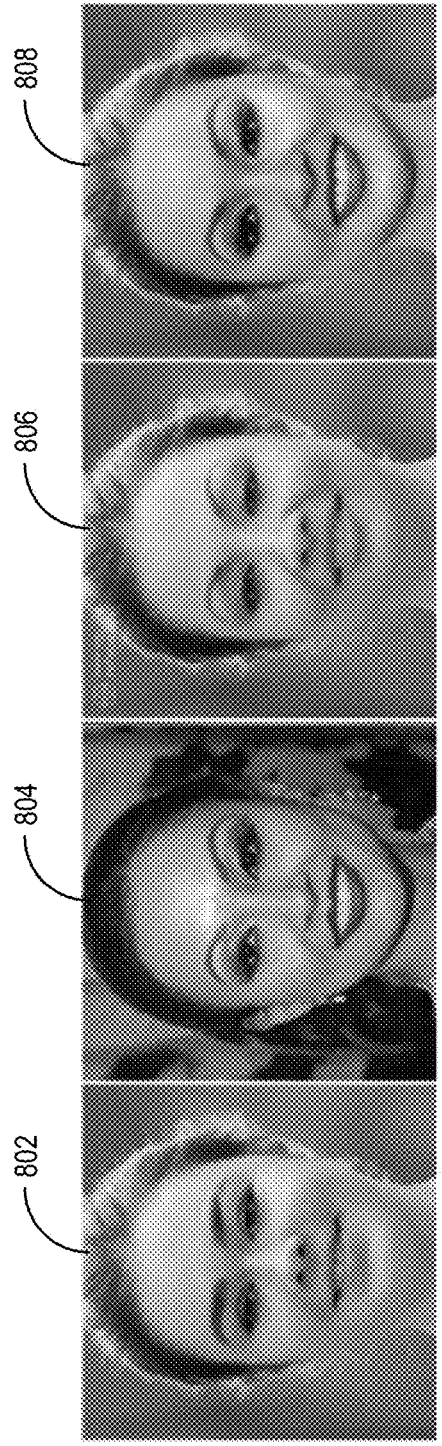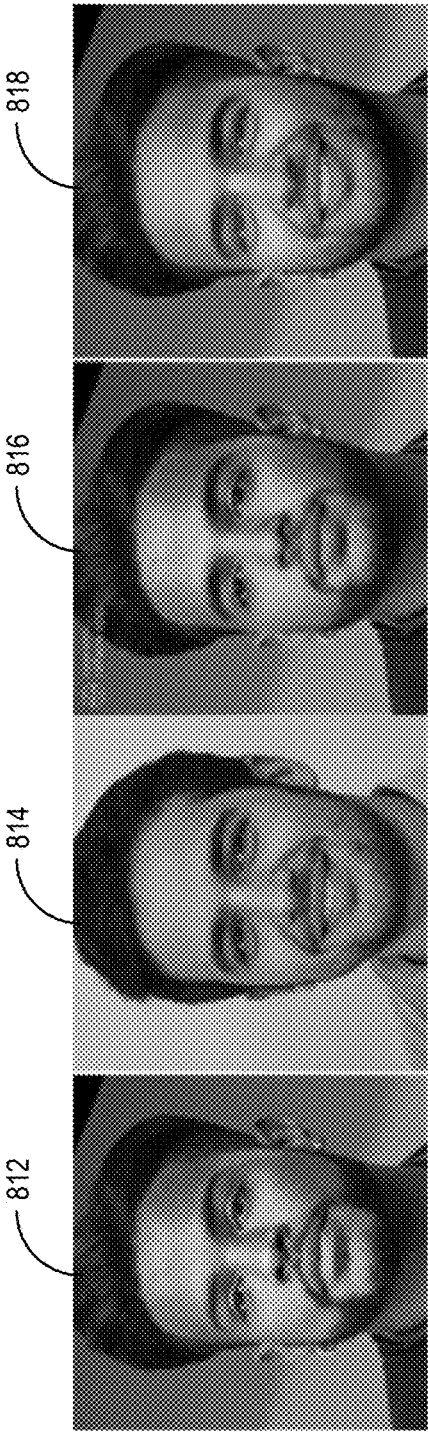
Fig. 8A
Fig. 8B

TRANSFERRING FACES BETWEEN DIGITAL IMAGES BY COMBINING LATENT CODES UTILIZING A BLENDING NETWORK

BACKGROUND

Recent years have seen significant improvements in digital graphics tools for creating or modifying digital content. In particular, individuals and businesses increasingly utilize digital graphics tools to edit images. Indeed, with the increased availability of mobile devices having built-in cameras, many individuals and businesses produce digital images and utilize digital graphics tools to edit those digital images. For instance, digital graphics tools are often used to edit digital images by transferring faces from one digital image to another. Unfortunately, many conventional face swapping systems that transfer faces between digital images have a number of shortcomings with regard to accuracy, efficiency, and flexibility.

BRIEF SUMMARY

Embodiments of the present disclosure solve one or more of the foregoing or other problems in the art with systems, non-transitory computer-readable media, and methods for latent-based modification of digital images. In particular, the disclosed systems modify source digital images using target images by transferring the target image facial features to the source images. For example, the disclosed systems and methods implement a trained neural network (i.e., a blending network) in conjunction with a generative neural network for improved latent-based combination of source digital images and target digital images. For instance, the disclosed systems and methods utilize a pre-trained blending network to improve processing times, reduce utilization of computation assets, and increase fidelity of modified digital images (i.e., combined or blended digital images).

To illustrate, in some embodiments, the disclosed systems utilize a blending network to combine latent codes of a source digital image and a target digital to determine a combined latent encoding for a combined digital image having a background, hairstyle, and/or skin tone of the source digital image and the facial features of the target digital image. The disclosed systems may also a generative neural network to generate the combined digital image from the combined latent encoding produced by the blending network. Furthermore, in some embodiments, the disclosed systems implement a modified multi-band blending model to generate a blended digital image from the combined digital image and the source digital image.

By utilizing a pre-trained blending network to combine latent code of digital images, the disclosed systems improve accuracy while reducing time and resources needed to transfer facial features between source and targe digital images. Moreover, the disclosed system improve flexibility to provide real-time or near real-time combination of digital images using arbitrary source and target digital images to generate high-resolution modified digital images (i.e., combined or blended digital images). Accordingly, the disclosed systems provide an accurate, efficient, and flexible tool for transferring facial features between arbitrary digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 8A-8B illustrate experimental results of a face swapping system utilizing a blending network in accordance with one or more embodiments.

DETAILED DESCRIPTION

Figure 1:
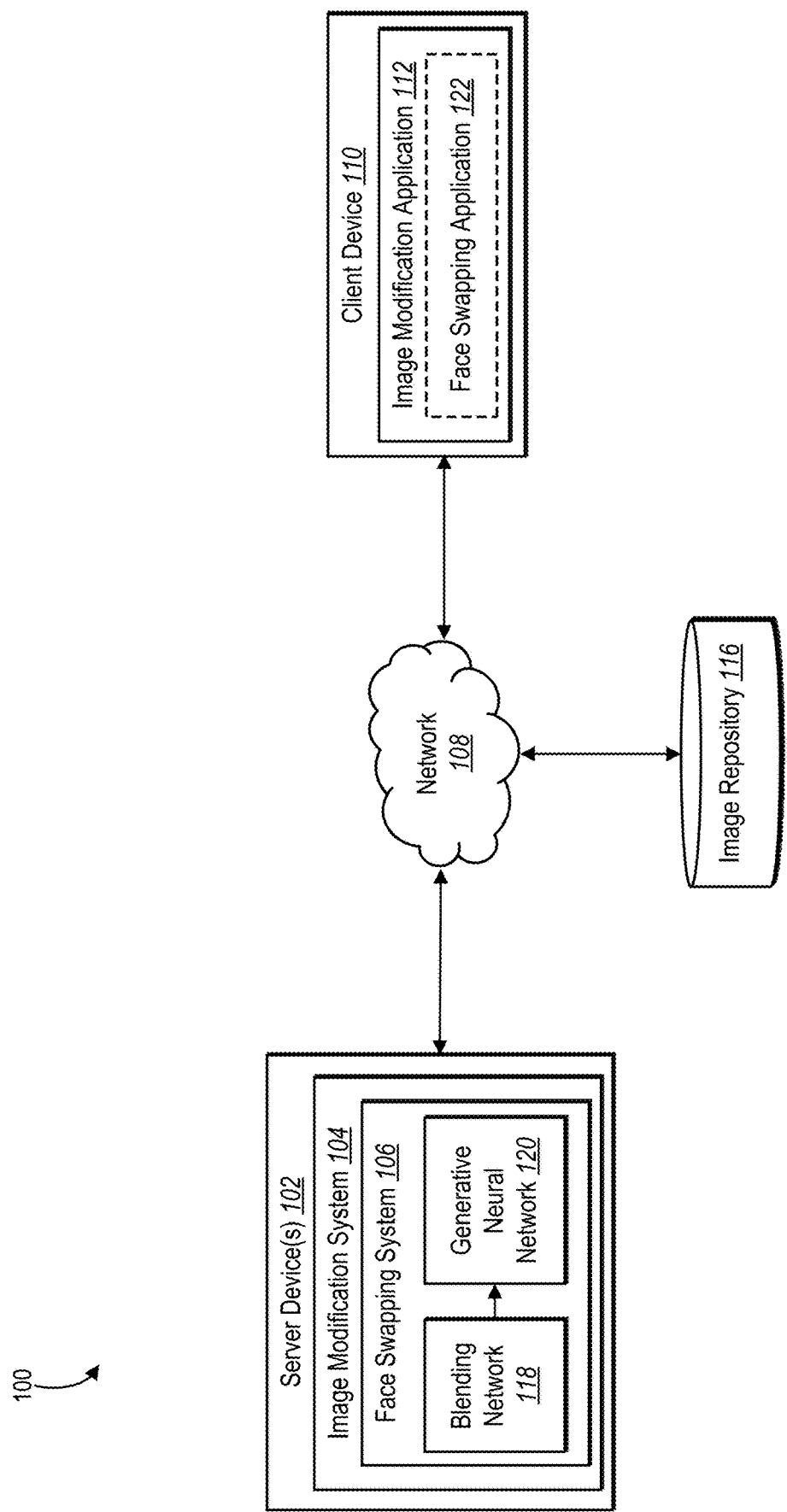
FIG. 1 illustrates a diagram of an environment in which a face swapping system operates in accordance with one or more embodiments.

This disclosure describes one or more embodiments of a face swapping system that utilizes a blending network to transfer facial features from a target digital image to a source digital image. More specifically, in one or more implementations, the face swapping system utilizes a generative neural network, such as a generative adversarial network (GAN), to perform one-shot face swapping with high quality. For example, the face swapping system utilizes a blending network that takes as input a source and a target image and outputs parameters that are used by the generative neural network. In particular, the generative neural network utilizes the parameters generated by the blending network to generate a combined image with the hair and background from the source image and the face from the target image.

The face swapping system improves transferring of faces and facial features between digital images in a flexible manner. Specifically, the face swapping system projects the target and source images into a latent space utilizing a neural network encoder of the generative neural network. The face swapping system then utilizes the blending network to combine latent codes from the source and target images. The face swapping system then generates a combined digital image from the combined latent codes utilizing a decoder or generator of the generative neural network. In some instances, the face swapping system also incorporates a multi-band blending model to generate a blended digital image at a high resolution with improved fidelity over conventional systems and methods.

To further illustrate, in one or more embodiments, the face swapping system projects the source image and the target image into a latent space utilizing a neural network encoder of a generative neural network. For instance, the face swapping system projects the source image and the target image into the W space, the W+ space, or the style space utilizing an encoder of a StyleGan type generative adversarial neural network. The face swapping system utilizes the blending network to combine the latent codes of a source digital image and a target digital image to generate a combined latent encoding. The face swapping system generates a combined digital image from the combined latent encoding using a decoder or generator of the StyleGan type generative adversarial neural network.

More specifically, in one or more embodiments, the face swapping system utilizes a series of independent layers of a blending network to determine a series of interpolation factors for combining corresponding series of latent vectors for a source digital image and a target digital image. In some embodiments, the face swapping system trains the independent layers of the blending network to iteratively adjust one or more parameters thereof based on one or more loss functions to reduce one or more losses associated with combination of the source digital image and the target digital image.

Additionally, in some embodiments, the face swapping system refines the combined digital image utilizing a blending process. For example, the face swapping system determines an intersection face mask between the source digital image and the combined digital image using a face segmentation network. The face swapping system combines the source digital image with the combined digital image using the intersection face mask to generate a blended digital image.

Additionally, the face swapping system also optionally utilizes a multi-band blending model to combine the source digital image and the combined digital image. Specifically, to further improve the fidelity of modified digital images (i.e., combined or blended digital images) relative to input source digital images and target digital images, in some embodiments, the face swapping system utilizes a multi-band blending model to blend the source digital image with the combined digital image generated using the blending network and the generative neural network. For instance, the face swapping system utilizes a modified Laplacian blending model that utilizes a first subset a blending layers to preserve details of the source digital image and a second subset of blending layers to combine the source digital image with the combined digital image to generate a blended digital image.

In one or more implementations, the disclosed face swapping system provides a variety of advantages and benefits over conventional systems and methods for transferring facial features between digital images. Conventional digital modification systems often modify digital images by transferring facial features from other digital images using generative neural networks, such as generative adversarial networks (GANs). Despite recent advancements in editing digital images using generative neural networks, however, conventional methods require large amounts of time, have high computational costs, and are often only capable of producing low-resolution images.

For example, many conventional face swapping systems that transfer facial features between digital images produce inaccurate results while modifying digital images to transfer facial features. For instance, many conventional systems produce a flawed depiction of the transferred facial features within the digital image such that the resulting image appears artificial. In addition, conventional systems oftentimes introduce variations in other parts of a digital image while modifying the digital image to include the transferred facial features. These variations often produce modified images in which the depicted person is unlike either of the originally depicted persons. Moreover, many conventional image modification methods result in a reduction of quality or resolution of the modified digital images having transferred facial features. Oftentimes, conventional systems produce modified digital images that are unusable due to such inaccuracies and poor resolutions.

To mitigate the inaccuracies introduced when transferring facial features between digital images, some conventional face swapping systems utilize alternative methods that require substantial amounts of computer memory and other computational resources. For example, conventional systems capable of producing high-resolution images often require independent training of a generative neural network for each pair of input digital images. Such individualized neural network training requires significant time and resources. Thus, conventional systems requiring individualized training of neural networks are often limited to a finite set of digital images. As such, conventional systems often cannot efficiently transfer details between arbitrary digital images to produce an accurate, high-definition modified image.

As mentioned, the disclosed face swapping system provides a variety of advantages and benefits over conventional systems and methods. For example, by utilizing a blending network to combine latent codes of source digital images and target digital images, the face swapping system improves the accuracy and fidelity of modified digital images relative to conventional systems. Indeed, by training the blending network to combine digital images, the face swapping system improves flexibility by allowing for the transfer of facial features from an arbitrary target digital image to an arbitrary source digital image. Furthermore, the face swapping system is to generate a high-resolution (e.g., at least 1024×1024 pixels) modified digital image exhibiting improved visual quality and identity preservation relative to conventional systems.

For example, the face swapping system is able to better transfer identify from a target image to a source image compared to conventional approaches. In particular, the face swapping system is also better at conversing the background information from the source image and facial details from the target image than many conventional systems. In particular, the face swapping system helps ensure consistent skin tone and lighting transfer from the source image to the resultant combined image. In particular, the face swapping system utilizes a multi-band blending approach to help ensure that lighting and skin tone from the source image is maintained in the combined image.

Additionally, the face swapping system provides increased flexibility over conventional systems by controlling the kind of texture that is, or is not, transferred between the images during the face swapping process. In particular, the face swapping system utilizes a texture loss to ensure that types of texture (e.g., facial hair) is or is not transferred.

Also, by utilizing a pre-trained blending network in conjunction with a generative neural network, in one or more embodiments the face swapping system exhibits increased efficiency relative to conventional systems. For example, while many conventional systems require a neural network to be trained to each specific pair of input source and target digital images, one or more embodiments of the face swapping system are operable to combine an arbitrary pair of input digital images with a pre-trained blending network. Indeed, in certain implementations, the face swapping system is capable of real-time or near real-time transferring of facial features between arbitrary digital images.

Turning now to the figures, FIG. 1 illustrates a schematic diagram of one embodiment of a system 100 (or environment) in which a face swapping system 106 operates in accordance with one or more embodiments. As illustrated, the system 100 includes server device(s) 102, a network 108, a client device 110, and an image repository 116. As further illustrated, the server device(s) 102, the client device 110, and the image repository 116 communicate with one another via the network 108.

As shown in FIG. 1, the server device(s) 102 include an image modification system 104 that further includes the face swapping system 106. For instance, the server device(s) 102 includes, but is not limited to, a computing device (such as explained below in reference to FIG. 13). In some embodiments, the face swapping system 106 combines latent codes of a source digital image and a target digital image utilizing a blending network 118 to determine a combined latent encoding.

A latent vector or latent code refers to a digital data embedding of latent (or hidden) features of a neural network. For example, a latent vector includes a vector reflecting features of a digital image that are indecipherable (to a human) but, when processed by layers of a generative neural network, generate a digital image. Relatedly, the term "latent space" refers to a multi-dimensional space containing latent values (e.g., latent vectors) that cannot be interpreted directly but which encode a meaningful internal representation of externally observable features (e.g., features of a digital image). In one or more embodiments, a latent vector comprises a multi-dimensional dataset that represents attributes and/or characteristics of visual features related to an image, video, and/or video frame. In the context of an image, a latent vector includes data representing characteristics (or features) of pixels of the image in some embodiments.

In some instances, the face swapping system 106 receives a request to transfer facial features of a target digital image to a source digital image from the client device 110. In response, the face swapping system 106 performs the transfer in latent space by using the blending network 118 to combine the latent codes of the two digital images into a combined latent encoding. Subsequently, the face swapping system 106 utilizes a generative neural network 120 to generate a combined digital image (e.g., a modified digital image with facial features transferred from the target digital image 204 to the source digital image 202) from the combined latent encoding (as further described below).

As mentioned, the face swapping system 106 transfers a face from a target image to a source image. An image (sometimes referred to as "digital image") refers to a digital symbol, picture, icon, and/or other visual illustration depicting one or more objects. For instance, an image includes a digital file having a visual illustration and/or depiction of a person with a hairstyle (e.g., a portrait image) or wrinkles. Indeed, in some embodiments, an image includes, but is not limited to, a digital file with the following extensions: JPEG, TIFF, BMP, PNG, RAW, or PDF. In addition, in certain instances, an image includes a digital frame of a digital video. In particular, in one or more embodiments, an image includes a digital frame within, but not limited to, a digital file with the following extensions: MP4, MOV, WMV, AVI, or AVI.

Furthermore, as shown in FIG. 1, the system 100 includes the client device 110. In some embodiments, the client device 110 includes, but is not limited to, a mobile device (e.g., smartphone, tablet), a laptop, a desktop, or any other type of computing device, including those explained below in reference to FIG. 13. Although not shown in FIG. 1, some embodiments of client device 110 are operated by a user to perform a variety of functions via an image modification application 112. For example, the client device 110 (through the image modification application 112 and the face swapping application 122) performs functions such as, but not limited to, swapping faces in digital images. In addition, in some embodiments, the client device 110 also receives modified versions of digital images (e.g., source digital images modified by transferring facial features of a target digital image thereto) from the face swapping system 106.

To access the functionalities of the face swapping system 106 (as described above and in greater detail below), in one or more embodiments, a user interacts with the image modification application 112 on the client device 110. For example, the image modification application 112 includes one or more software applications (e.g., to interact with and/or modify images in accordance with one or more embodiments herein) installed on the client device 110, such as face swapping application 122. In certain instances, the image modification application 112 is hosted on the server device(s) 102. Additionally, when hosted on the server device(s) 102, the image modification application 112 is accessed by the client device 110 through a web browser and/or another online interfacing platform and/or tool.

Although FIG. 1 illustrates the face swapping system 106 being implemented by a particular component and/or device within the system 100 (e.g., the server device(s) 102), in some embodiments the face swapping system 106 is implemented, in whole or part, by other computing devices and/or components in the system 100. For instance, in some embodiments, the face swapping system 106 is implemented on the client device 110 within the face swapping application 122. More specifically, in one or more embodiments, the description of (and acts performed by) the face swapping system 106 are implemented (or performed by) the face swapping application 122 when the client device 110 implements the face swapping system 106. In particular, in some embodiments, the client device 110 (via an implementation of the face swapping application 122) combines latent codes of a source digital image and a target digital image using blending network 118 to determine a combined latent encoding before generating a combined digital image using the generative neural network 120.

In some embodiments, the server device(s) 102 trains one or more machine-learning models described herein. For example, the face swapping system 106 on the server device(s) 102 provides the one or more trained machine-learning models to the face swapping application 122 on the client device 110 for implementation. In other words, the client device 110 obtains (e.g., downloads) the machine-learning models from the server device(s) 102. At this point, the client device 110 may utilize the machine-learning models to generate modified digital images (i.e., combined or blended digital images) independent from the server device(s) 102.

In some embodiments, the face swapping application 122 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a digital image). In response, the face swapping system 106 on the server device(s) 102 performs operations described herein to generate a combined digital image. The server device(s) 102 then provides the output or results of the operations (e.g., a combined or blended digital image) to the client device 110.

As further shown in FIG. 1, the system 100 includes the image repository 116. In one or more embodiments, the image repository 116 includes, but is not limited to, a server device, a cloud service computing device, or any other type of computing device (including those explained below with reference to FIG. 13) that stores one or more digital images. In some embodiments, the face swapping system 106 accesses the image repository 116 to retrieve one or more digital images. For example, the face swapping system 106 utilizes images from the image repository 116 to transfer facial features between or otherwise combine digital images using the blending network 118 and generate a combined digital image using the generative neural network 120. In some instances, the face swapping system 106 performs the above-mentioned tasks upon receiving a request from the client device 110 to utilize digital images from the image repository 116.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 13. Furthermore, although FIG. 1 illustrates the server device(s) 102, the client devices 110, and the image repository 116 communicating via the network 108, in certain embodiments, the various components of the system 100 communicate and/or interact via other methods (e.g., the server device(s) 102 and the client device 110 communicating directly).

As discussed above, in one or more embodiments, the face swapping system 106 combines latent codes of digital images to transfer facial features between a source digital image and a target digital image. In particular, the face swapping system 106 uses the blending network 118 to generate a combined latent encoding and generates a combined digital image using the generative neural network 120 therefrom.

As used herein, term "neural network" refers to a machine learning model that can be tuned (e.g., trained) based on inputs to approximate unknown functions. In particular, a neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network. Examples of neural networks include a convolutional neural network (CNN), a recurrent neural network (e.g., a long short-term memory neural network), a generative adversarial neural network (GAN), or another multi-layer neural network. In some embodiments, a neural network includes a combination of neural networks or neural network components.

Relatedly, the term "generative neural network" refers to a neural network that generates digital content. In some cases, the generative neural network includes a neural network that generates digital images from one or more input features (e.g., an input digital image or noise). For example, a generative neural network includes a neural network that reconstructs target digital images from learned latent vectors. In one or more of the disclosed embodiments, the generative neural network includes a generative adversarial neural network (GAN), such as StyleGAN as described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety. Another example of a GAN includes a StyleGAN2 as described by T. Karras et al. in *Analyzing and improving the image quality of stylegan*, Proceedings of the IEEE/CVF conference on computer vision and pattern recognition, 2020, the content of which is hereby incorporated by reference in its entirety.

Figure 2:
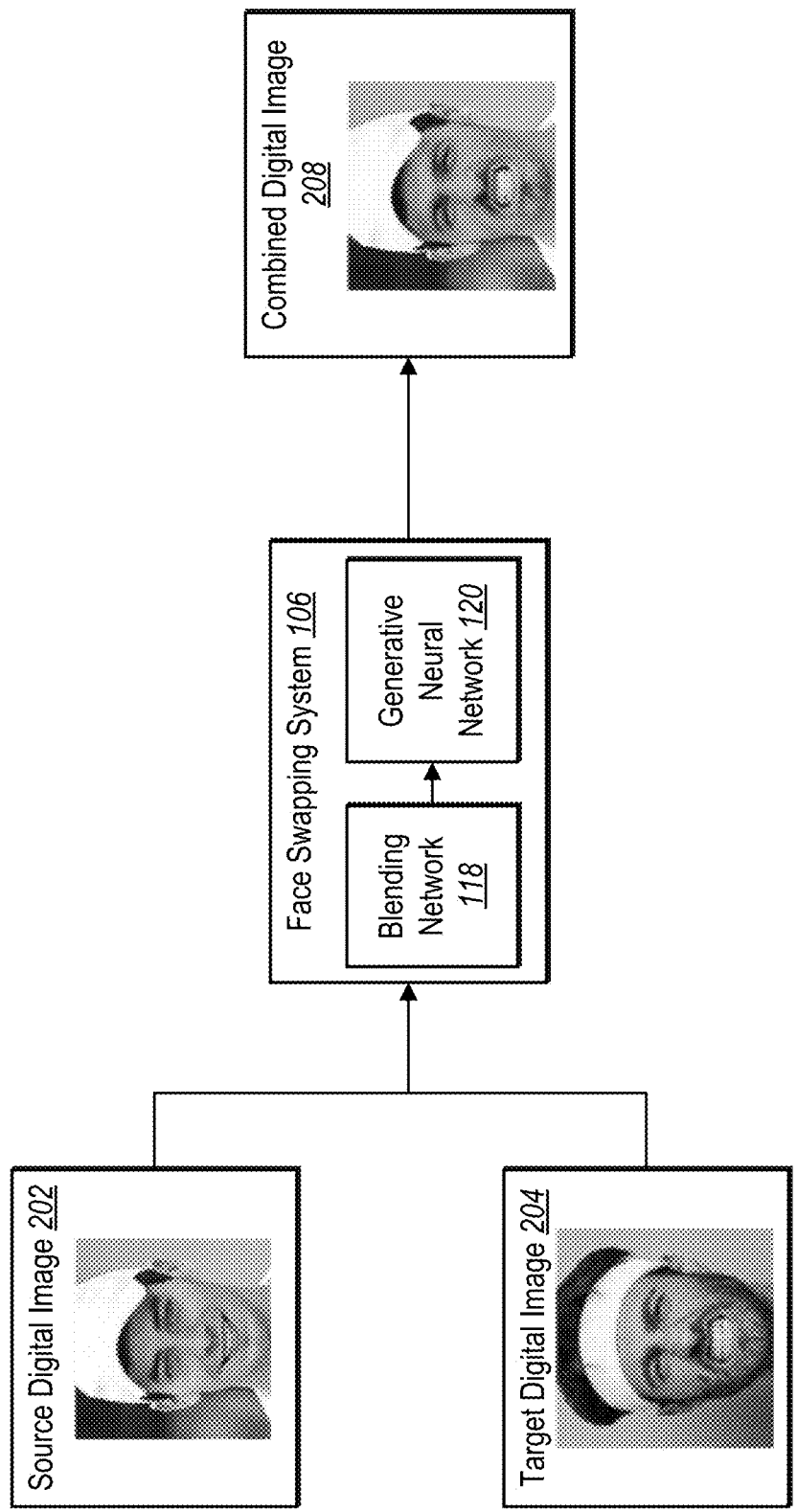
FIG. 2 illustrates an overview of a face swapping system generating a combined digital image in accordance with one or more embodiments.

As shown in FIG. 2, the face swapping system 106 identifies (or receives) a source digital image 202 depicting a first person and identifies (or receives) a target digital image 204 depicting a second person. Subsequently, as shown in FIG. 2, the face swapping system 106 generates a combined digital image 208 from the source digital image 202 and the target digital image 204 (in accordance with one or more embodiments disclosed herein). Indeed, as illustrated in FIG. 2, the face swapping system 106 generates a combined digital image 208 that depicts the first person of the source digital image 202 with the facial features of the second person of the target digital image 204.

As shown in FIG. 2, the face swapping system 106 allows a user to select a target image depicting a person with facial features. As explained in greater detail below, illustrated face swapping system 106 utilizes the blending network 118 to combine latent codes of the source digital image 202 and the target digital image 204. The face swapping system 106 uses the generative neural network 120 to generate the combined digital image 208 from the combined latent codes. In some embodiments, the face swapping system 106 receives latent codes corresponding to the source digital image 202 and the target digital image 204 for combination thereof. The face swapping system 106 transfers the facial features of the target image 204 to the person of the source image 202. Furthermore, the face swapping system 106 generates a realistic combined digital image 208 devoid of artifacts and other inaccuracies common to conventional systems.

Figure 3:
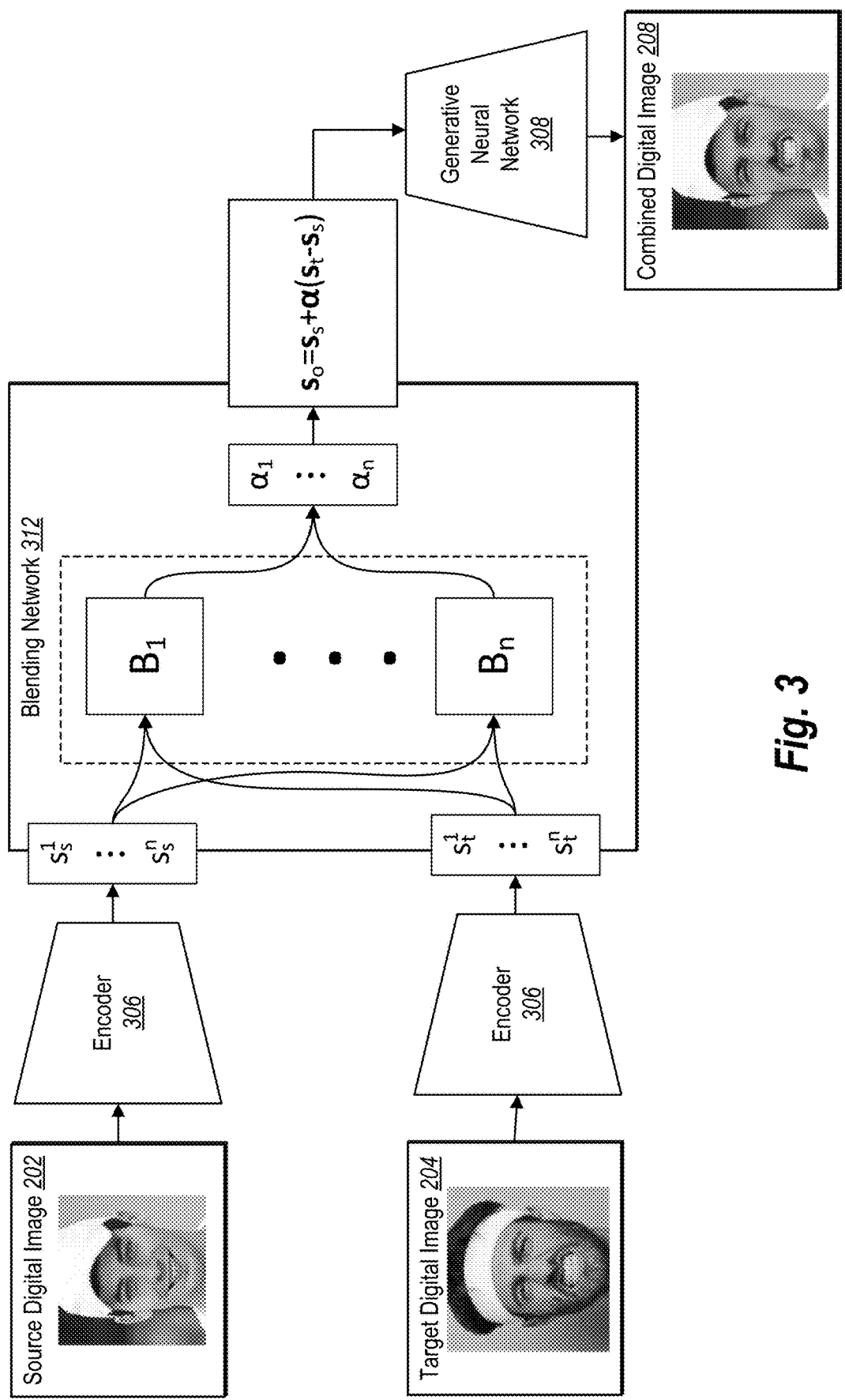
FIG. 3 illustrates a face swapping system generating a combined digital image utilizing a blending network in accordance with one or more embodiments.

As mentioned above, in one or more embodiments, the face swapping system 106 utilizes a blending network and a generator of a generative neural network to generate a combined digital image with the background and hair of a source digital image and the face from a target digital image. For example, FIG. 3 illustrates the face swapping system 106 utilizing a blending network 312 to combine latent codes of a source digital image 202 and a target digital image 204 to generate a combined latent encoding. FIG. 3 further illustrates the face swapping system 106 generating a combined digital image 208 from the combined latent encoding using a generative neural network 308.

Specifically, FIG. 3 illustrates the face swapping system 106 utilizing an encoder 306 to project the source digital image 202 and the target digital image 204 into a latent space (e.g., into the latent space known as Style space) to determine latent codes for the respective digital images. To further illustrate, the encoder 306 includes, but is not limited to, a neural network encoder used to learn encodings of data for projecting images into latent space. Also, in some embodiments, the face swapping system 106 receives latent codes corresponding to digital images previously projected into latent space.

As used herein, the term "neural network encoder" refers to a computer-implemented neural network that projects digital images (or portions thereof) into a latent space. In particular, a neural network encoder projects image segments into latent vectors. In one example, a neural network encoder comprises a StyleGAN encoder that projects detailed and edited segments into a residual detail latent code in the Style space. In another example, a neural network encoder comprises a ReStyle encoder that projects detailed and edited segments into a residual detail latent code in the W+ space. More particularly, in some embodiments, face swapping system 106 utilizes a modified version of the ReStyle Encoder as described by Y. Alaluf, et al. in Restyle: A residual-based stylegan encoder via iterative refinement. arXiv preprint arXiv:2104.02699, 2021, the content of which is hereby incorporated by reference in its entirety.

As shown in FIG. 3, the face swapping system 106 utilizes encoder 306 to generate latent codes corresponding to the source digital image 202 and the target digital image 204, including source latent vectors $s_s^1$-$s_s^n$ corresponding to the source digital image 202 and target latent vectors $s_t^1$-$s_t^n$ corresponding to the target digital image 204. Subsequently, the face swapping system 106 utilizes independent layers $B_1$-$B_n$ (i.e., independent subnetworks) of the blending network 312 to determine interpolation factors $\alpha_1$-$\alpha_n$ for combining source latent vectors $s_s^1$-$s_s^n$ and target latent vectors $s_t^1$-$s_t^n$ according to the following algorithm:

$$s_o = s_s + \alpha(s_t - s_s)$$

wherein $s_o$ represents a set of output vectors $s_o^1$-$s_o^n$ (i.e., combined latent vectors of a combined latent encoding), $s_s$ represents the source latent vectors $s_s^1$-$s_s^n$, $s_t$ represents the target latent vectors $s_s^1$-$s_s^n$, and $\alpha$ represents the interpolation factors $\alpha_1$-$\alpha_n$.

In some implementations, for example, the latent vectors include 18 latent style vectors $s_s^1$-$s_s^{18}$ and $s_s^1$-$s_s^{18}$ (i.e., latent vectors in a style space of a StyleGAN or similar image generation system architecture) for the source digital image 202 and the target digital image 204, respectively. Accordingly, the blending network 312, in such implementations, includes 18 independent layers or subnetworks $B_1$-$B_{18}$, each independent layer is trained to determine interpolation factors $\alpha_1$-$\alpha_{18}$ for each respective source and target latent vectors (e.g., independent layer $B_1$ trained to determine interpolation factor $\alpha_1$ for combining source latent vector $s_s^1$ with target latent vector $s_t^1$). Also, in some embodiments, each independent layer (or subnetwork) $B_1$-$B_n$ consists of several linear layers, each of which is followed by a non-linear activation (e.g., leaky ReLU activation).

In one or more embodiments, the face swapping system 106 implements one or more loss functions to train the blending network 312 to determine the combined latent vectors $s_o$ that correspond to an image which depicts the facial features of the target digital image 204 transferred to the source digital image 202. For instance, in some implementations, the face swapping system 106 trains the blending network 312 using a batch of source images and target images to randomly generate combined digital images and iteratively adjust one or more parameters of the blending network 312 to reduce each of a plurality of losses associated with various aspects of each generated combined digital image. Furthermore, in some embodiments, the face swapping system 106 learns parameters of each independent layer or subnetwork $B_1$-$B_n$ of the blending network 312 to independently reduce the plurality of losses for each individual layer or subnetwork $B_1$-$B_n$. Indeed, by independently training/adjusting each independent layer or subnetwork $B_1$-$B_n$, the blending network 312 determines individual combined latent vectors $s_o^1$-$s_o^n$ that, when input to the generative neural network 308, result in a high-fidelity, realistic combined digital image 208 having the modifications and features to which the blending network 312 is trained to implement.

As mentioned previously, the face swapping system 106 utilizes the generative neural network 308 to generate the combined digital image 208 from the output latent vectors $s_o$ produced by the blending network 312. To further illustrate, the generative neural networks discussed herein can include, but are not limited to, a generative adversarial neural network (GAN) that is trained on a dataset of facial images to generate facial images from latent vectors. In some embodiments, the face swapping system 106 utilizes a generative neural network based on a variety of neural network models such as, but not limited to, an unconditional GAN, a Deep Convolutional GAN (DCGAN), and/or a conditional GAN (cGAN). In addition to or as an alternative to a GAN, in some embodiments, the face swapping system 106 utilizes recurrent neural networks (RNN) and/or convolutional neural networks (CNN) to generate digital images from latent vectors.

Additionally, as mentioned above, some embodiments of the face swapping system 106 utilize a multi-band blending model to combine a source digital image with a combined digital image generated using the blending network and the generative neural network. For example, FIG. 4 illustrates the face swapping system 106 combining a source digital image and a combined digital image (i.e., a combination of the source digital image and a target digital generated according to one or more embodiments discussed herein) using a blending model 410 to generate a blended digital image.

Figure 4:
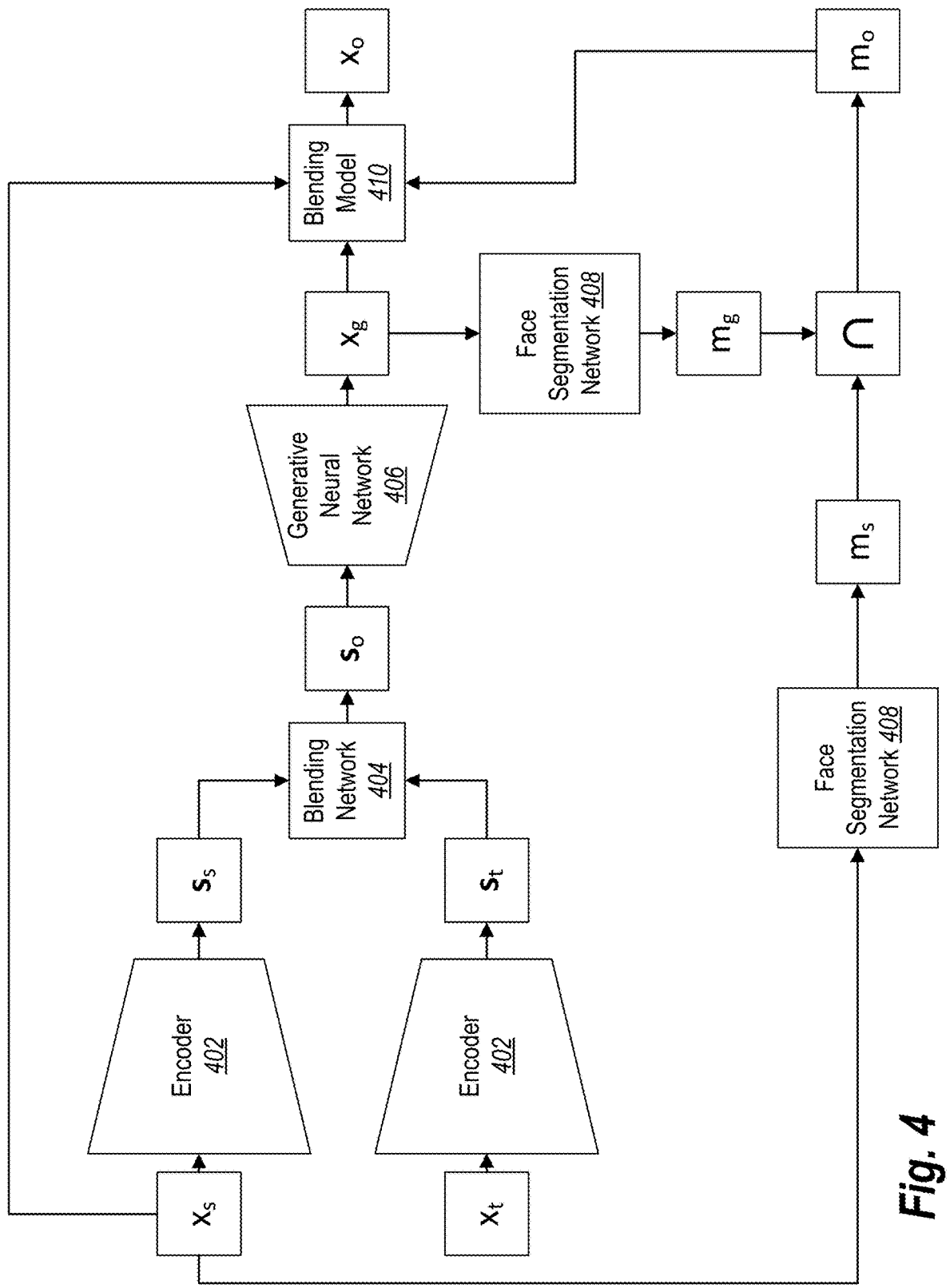
FIG. 4 illustrates a face swapping system generating a combined digital image, an intersection face mask, and a blended digital image in accordance with one or more embodiments.

As shown in FIG. 4, the face swapping system 106 projects a digital representation $x_s$ of the source digital image and a digital representation $x_t$ of the target digital image into a latent space using an encoder 402 to determine source latent vectors $s_s$ for the source digital image and target latent vectors $s_t$ for the target digital image. As described in more detail above, the face swapping system 106 combines the source latent vectors $s_s$ and the target latent vectors $s_t$ using a blending network 404 to determine combined latent vectors $s_o$ and generates a digital representation $x_g$ of a combined digital image using a generative neural network 406.

Further, as illustrated in FIG. 4, the face swapping system 106 utilizes a face segmentation network 408 to generate a source face mask $m_s$ from the digital representation $x_s$ of the source digital image and a combined face mask $m_g$ from the digital representation $x_g$ of the combined digital image. As shown, the face swapping system 106 then compares the source face mask $m_s$ and the combined face mask $m_g$ to determine an intersection face mask $m_o$ for input into the blending model 410 to indicate a blending region for combining the source digital image and the combined digital image to generate a digital representation $x_o$ of a blended digital image.

Accordingly, in some embodiments, the face swapping system 106 utilizes various pre-trained neural networks to modify and/or combine digital images to produce modified digital images, such as a combined digital image generated from a combined latent encoding determined by the blending network 404 or a blended digital image generated by further blending the generated combined digital image with the source digital image using the blending model 410.

To further illustrate, in some embodiments, the face swapping system 106 utilizes the following algorithm to transfer facial features between digital images to generate a modified digital image. The face swapping system 106 utilizes as inputs $x_s$: source digital image and $x_t$: target digital image. In or more implementations, the face swapping system 106 generates various intermediate or final outputs during the processing including: $s_s$: latent code of source digital image, $s_t$: latent code of target digital image, $s_o$: latent code of combined digital image (i.e., combined latent encoding), $x_g$: combined digital image, $m_s$: source image face mask, $m_g$: combined image face mask, $m_o$: intersection face mask, and $x_o$: modified digital image (i.e., blended digital image). In particular, the face swapping system 106 projects images into latent code using the learned encoder E (402 in FIG. 4). In particular, the face swapping system 106 generates a set of latent codes $s_s$ by projecting the source image $x_s$ into a latent space using the encoder E as follows: $s_s = E(x_s)$. Similarly, the face swapping system 106 generates a set of latent codes $s_t$ by projecting the target image $x_t$ into the latent space using the encoder E as follows: $s_t = E(x_t)$. The face swapping system 106 generates a combined latent code $s_o$ by combining the latent codes $s_s$ and $s_t$ using blending network B (404 in FIG. 4) as follows: $s_o = B(s_s, s_t)$. The face swapping system 106 generates a combined digital image $x_g$ using generative neural network G (406 in FIG. 4) as follows: $x_g = G(50)$. The face swapping system 106 generates a face mask $m_s$ for the source image $x_s$ utilizing a face segmentation network F (408 in FIG. 4) as follows: $m_s = F(x_s)$. Similarly, the face swapping system 106 generates a face mask $m_g$ for the combined digital image $x_g$ utilizing the face segmentation network F as follows: $m_g = F(x_g)$. The face swapping system 106 generates an intersection face mask $m_o$ from the face mask $m_s$ for the source image $x_s$ and the face mask $m_g$ and for the combined digital image $x_g$ as follows: $m_o = m_s \cap m_g$. The face swapping system 106 then generates a blended digital image $x_o$ from the source image $x_s$, the combined digital image $x_g$ and the intersection face mask $m_o$ utilizing a blending model 410 (indicated as blend) as follows: $x_o = \text{blend}(x_s, x_g, m_o)$.

In some embodiments, the face swapping system 106 trains the blending network by reducing one or more losses related to generating a modified (i.e., combined) digital image. For instance, in some embodiments, the face swapping system 106 implements one or more loss functions corresponding to characteristics (e.g., background, facial shape, facial texture) of the input source digital images to train the blending network to combine and/or modify digital images. For example, in some implementations, the face swapping system 106 trains the blending network utilizing a mask loss. In particular, the face swapping system 106 extracts face masks for source image $x_s$ and combined image $x_g$ combinations and minimizes a difference between the two face masks according to the following mask loss function:

$$L_{mask} = \|m_s - m_g\|_2^2$$

In some implementations, the face swapping system 106 trains the blending network implementing a background matching term to reduce a Learned Perceptual Image Patch Similarity (LPIPS) and Mean Squared Error (MSE) losses between backgrounds of input source images $x_s$ and combined images $x_g$ according to the following background loss function:

$$L_{background} = \text{LPIPS}(x_s, x_g; (1-m_s)) + \|(1-m_s) \odot (x_s - x_g)\|_2^2$$

In some implementations, the face swapping system 106 trains the blending network implementing a texture loss to preserve texture details (e.g., skin tone and facial hair) of the source image by minimizing the texture loss between the Gram matrix (i.e., the Hermitian matrix of inner products of a set of vectors) of face masks for input source images $x_s$ and combined images $x_g$ according to the following texture loss function:

$$L_{texture} = \|\text{Gram}(m_s * x_s) - \text{Gram}(m_s * x_g)\|_2^2$$

In some implementations, the face swapping system 106 trains the blending network implementing a source localization robustness loss by randomly perturbing channels of the style latent space (as described above in relation to FIG. 3) to obtain perturbed source latent vectors $s_s'$ and reducing any differences in the face area of combined images generated from $s_o = B(s_s, s_t)$ and $s_o' = B(s_s', s_t)$ using generative neural network G, according to the following source localization robustness loss function:

$$L_{localization}^s = \|m_s \odot G(B(s_s, s_t)) - m_s \odot G(B(s_s', s_t))\|_2^2$$

Additionally, in some embodiments, the face swapping system 106 implements one or more loss functions corresponding to characteristics (e.g., face identity) of the input target face images to train a blending network to combine and/or modify digital images. For example, in some implementations, the face swapping system 106 trains the blending network implementing a foreground matching term to reduce the Learned Perceptual Image Patch Similarity (LPIPS) and Mean Squared Error (MSE) losses between foregrounds (i.e., face areas) of input target images $x_t$ and combined images $x_g$ according to the following foreground loss function:

$$L_{foreground} = \text{LPIPS}(x_t, x_g; m_o) + \|m_o \odot (x_t - x_g)\|_2^2$$

In some implementations, the face swapping system 106 trains the blending network implementing an ID loss to increase the cosine similarity of face embeddings of input target images $x_t$ and combined images $x_g$ according to the following ID loss function:

$$L_{ID} = 1 - \cos(\text{arcface}(x_t), \text{arcface}(x_g))$$

In some implementations, the face swapping system 106 trains the blending network implementing a target localization robustness loss by randomly perturbing channels of the style latent space (as described above in relation to FIG. 3) to obtain perturbed target latent vectors $s_t'$ and reducing any differences in the face area of combined images generated from $s_o = B(s_s, s_t)$ and $s_o' = B(s_s, s_t')$ using generative neural network G, according to the following source localization robustness loss function:

$$L_{localization}^t = \|(1-m_s) \odot G(B(s_s, s_t)) - (1-m_s) \odot G(B(s_s, s_t'))\|_2^2$$

Furthermore, in some embodiments, the face swapping system 106 implements one or more loss functions corresponding to the latent codes (i.e., source latent vectors, target latent vectors, combined latent vectors) to train a blending network to combine and/or modify digital images. For example, in some implementations, the face swapping system 106 trains the blending network implementing a fusion loss to scale/adjust the effects of each style channel (i.e., each layer of the blending network corresponding to a latent vector in style space, as described above in relation to FIG. 3). For each input pair of source and target images, the effect of each style channel on a given image area (e.g., face area or background) is calculated and quantified by a scalar between zero (no effect) and 1 (only affects the given area). In some implementations, having quantified the channels' effects to the background and to the face area, the face swapping system 106 trains the blending network according to the following fusion loss function:

$$L_{fusion} = \|w_{bkg} * (s_s - s_o)\|_2^2 + \|w_{face} * (s_t - s_o)\|_2^2$$

wherein $w_{bkg}$ represents the quantified effects of each blending channel on the background of the combined image, and $w_{face}$ represents the quantified effects of each blending channel on the face area of the combined image. Indeed, as indicated in the fusion loss function above, the fusion loss trains the blending network to give additional weight to the input source image for those channels affecting the background of the output combined image and additional weight to the input target image for those channels affecting the face area of the output combined image.

In some implementations, the face swapping system 106 trains the blending network implementing a cycle loss to further reduce losses associated with style channels found to have a relatively greater effect on the facial area by randomly perturbing style channels in the source latent vectors $s_s$ to obtain $s_s'(s_s'')$ and train the blending network to reconstruct $s_s$ when given $(s_s', s_s)$ or $(s_s, s_s'')$ as inputs (i.e., in place of source and target images), according to the following cycle loss function:

$$L_{cycle} = \|B(s_s', s_s) - s_s\|_2^2 + \|B(s_s, s_s'') - s_s\|_2^2$$

As discussed above in relation to FIG. 3, in some embodiments, the face swapping system 106 trains each layer or subnetwork of the blending network independently, such that different weights are implemented for each loss function in each layer or subnetwork of the blending network. For example, in some implementations, greater weight is given to the mask loss in layers of style space that exhibit a greater effect on the overall layout of the corresponding image, whereas greater weight is given to the texture loss in layers of style space that exhibit a greater effect on local texture of the corresponding image. Accordingly, in some embodiments, by independently training each layer or subnetwork of the blending network, the face swapping system 106 learns to efficiently generate modified digital images (i.e., combined or blended digital images) with increased fidelity to the details of the input source and target digital images.

Figure 5:
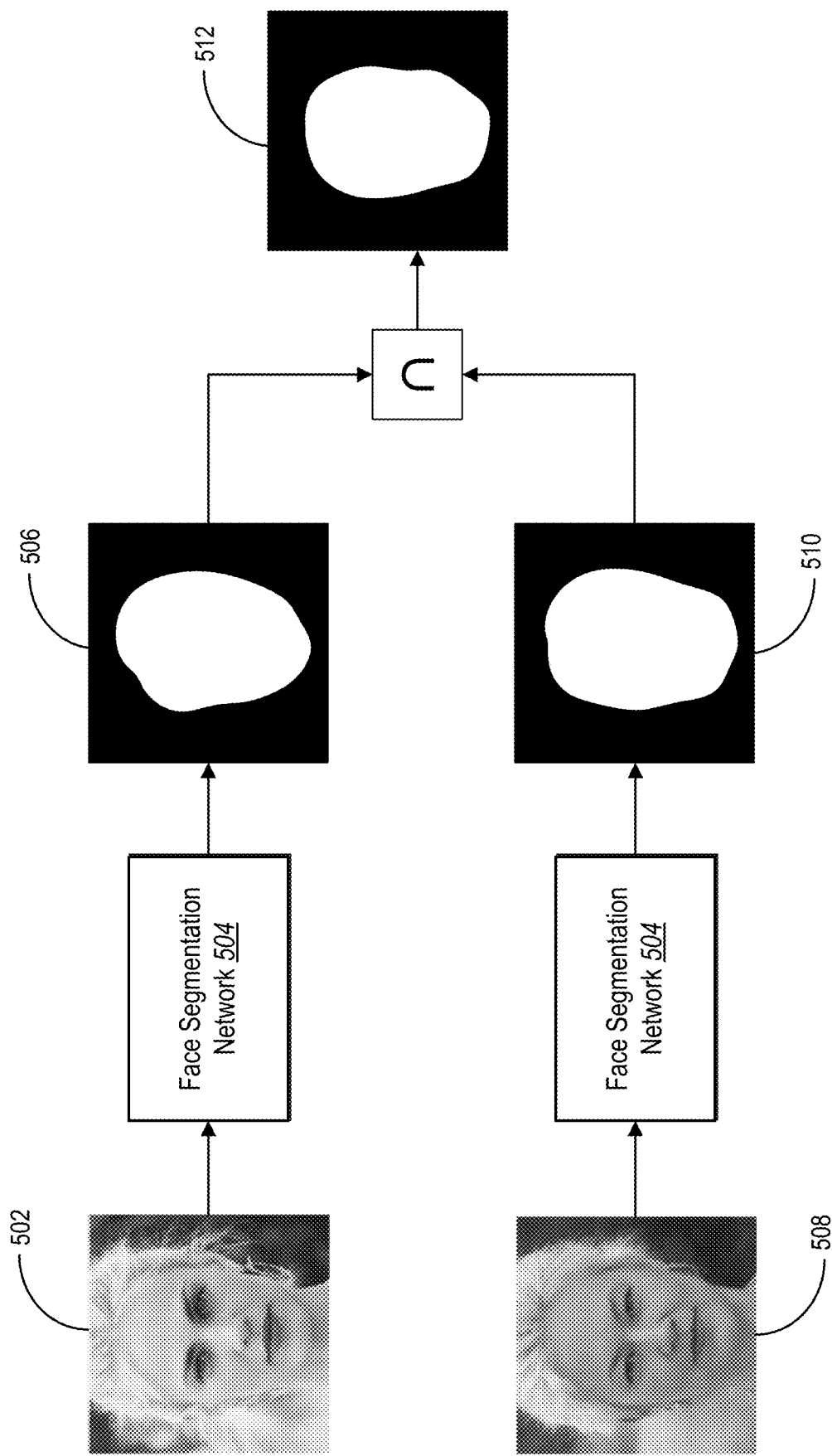
FIG. 5 illustrates a face swapping system generating an intersection face mask utilizing a face segmentation network in accordance with one or more embodiments.

As mentioned above, in one or more embodiments, the face swapping system 106 utilizes a face segmentation network to determine an intersection face mask for a source digital image and a combined digital image (i.e., a source and a target digital image combined using a blending network according to one or more embodiments). For example, FIG. 5 illustrates the face swapping system 106 utilizing a face segmentation network 504 to determine a source face mask 506 corresponding to a source digital image 502. The face swapping system 106 utilizes the face segmentation network 504 to generate a combined face mask 510 corresponding to a combined digital image 508. As further illustrated, the face swapping system 106 determines an intersection face mask 512 by comparing the source face mask 506 with the combined face mask 510. For example, the face swapping system 106 identifies the intersection face mask 512 as an intersection between the source face mask 506 and the combined face mask 510. For example, the face swapping system 106 identifies the intersection face mask 512 as a region in which the face from the source face mask 506 and the face from the combined face mask 510 overlap when the images are aligned over each other.

The face segmentation network 504, in one or more implementations, comprises a neural network trained to identify and isolate the pixels of an image corresponding to a face. In one or more implementations, the face segmentation network 504 comprises the exemplar-base face image segmentation algorithm described by Smith, et al. in *Exemplar-Based Face Parsing*, IEEE Computer Society Conference on Computer Vision and Pattern Recognition (CVPR), June 2013, the entire contents of which are hereby incorporated by reference.

As mentioned above, the face swapping system 106 generates a face mask. For example, as used herein, the term "face mask" refers to a demarcation useful for partitioning an image into separate portions. In particular, in some embodiments, a face mask refers to an identification of a portion of an image belonging to a face and a portion of the image belonging to a background and/or other objects that are not the face. For example, in some embodiments, a face mask includes a map of an image that has an indication for each pixel of whether the pixel corresponds to part of a face or not. In some implementations, the indication includes a binary indication (e.g., a "1" for pixels belonging to the face and a "0" for pixels not belonging to the ace). In alternative implementations, the indication includes a probability (e.g., a number between 1 and 0) that indicates the likelihood that a pixel belongs to a face. In such implementations, the closer the value is to 1, the more likely the pixel belongs to an object and vice versa.

As mentioned previously, in one or more embodiments, the face swapping system 106 utilizes a multi-band blending model to combine a source digital image and a combined digital image based on an intersection face mask. For example, FIG. 6 illustrates the face swapping system 106 combining a source digital image 602 and a combined digital image 604, based on a face mask 606 (e.g., an intersection face mask as described above in relation to FIG. 5), using a multi-band blending model 614.

Figure 6:
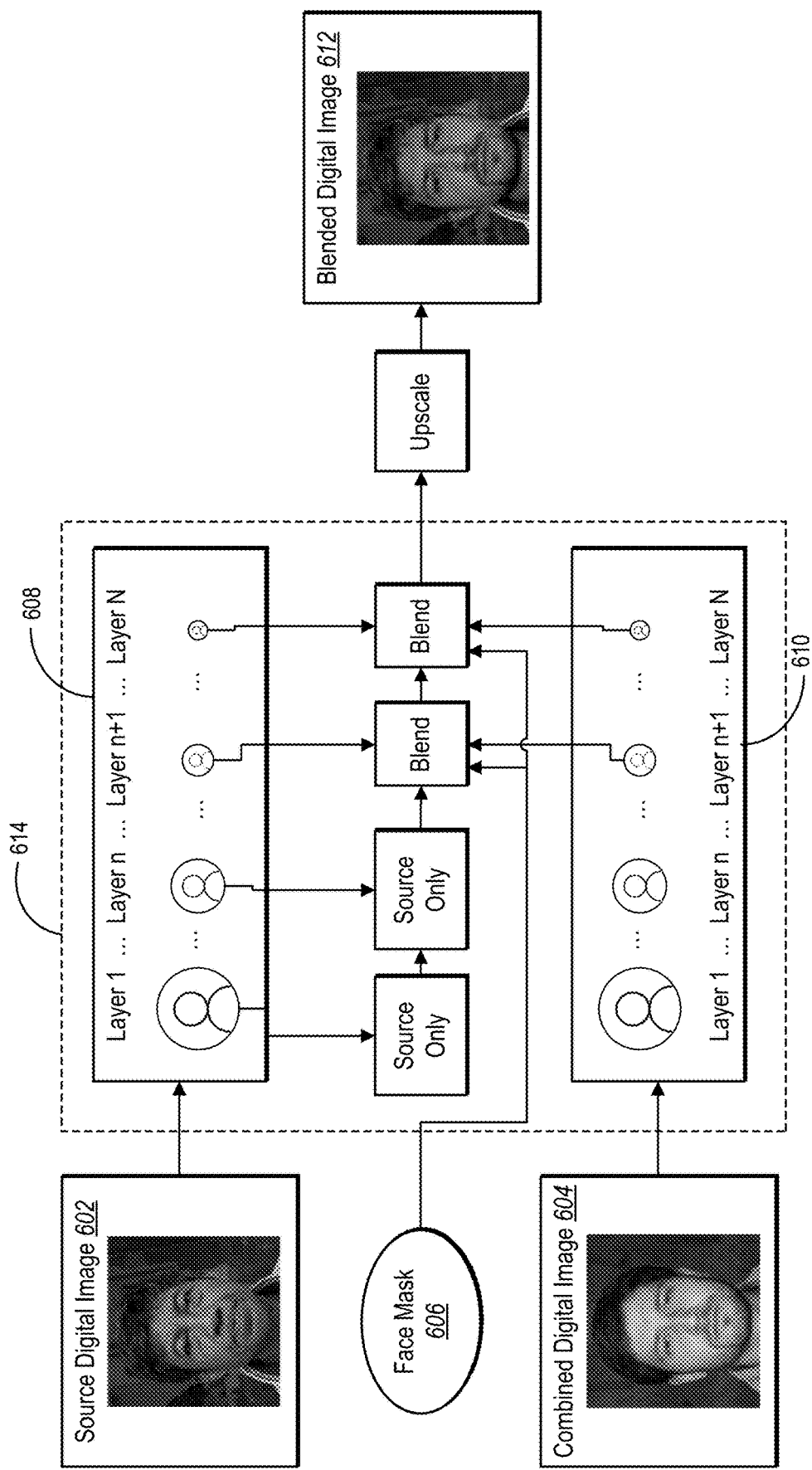
FIG. 6 illustrates a face swapping system combining digital images utilizing a multi-band blending model in accordance with one or more embodiments.

As illustrated in FIG. 6, the multi-band blending model 614 includes iterative scaling of the source digital image 602 into a plurality of layers 608 at descending resolutions and scaling of the combined digital image 604 into a plurality of layers 610 at corresponding resolutions. As shown, the face swapping system 106 blends the corresponding pluralities of layers 608, 610 in accordance with the blending model 614, wherein the first n layers of the plurality of layers 610 for the combined digital image are not blended with the first n layers of the plurality of layers 608 for the source digital image. As illustrated, the face swapping system 106 blends the subsequent n+1 through N layers of the plurality of layers 608 with the corresponding n+1 through N layers of the plurality of layers 610. By selectively blending a second subset of layers 608, 610 while keeping a first subset of layers 608 unaltered by the corresponding layers 610, significant details of the source digital image 602 are preserved in the blended digital image 612, thus increasing the fidelity of the blended digital image 612 to the source digital image 602.

Figure 7:
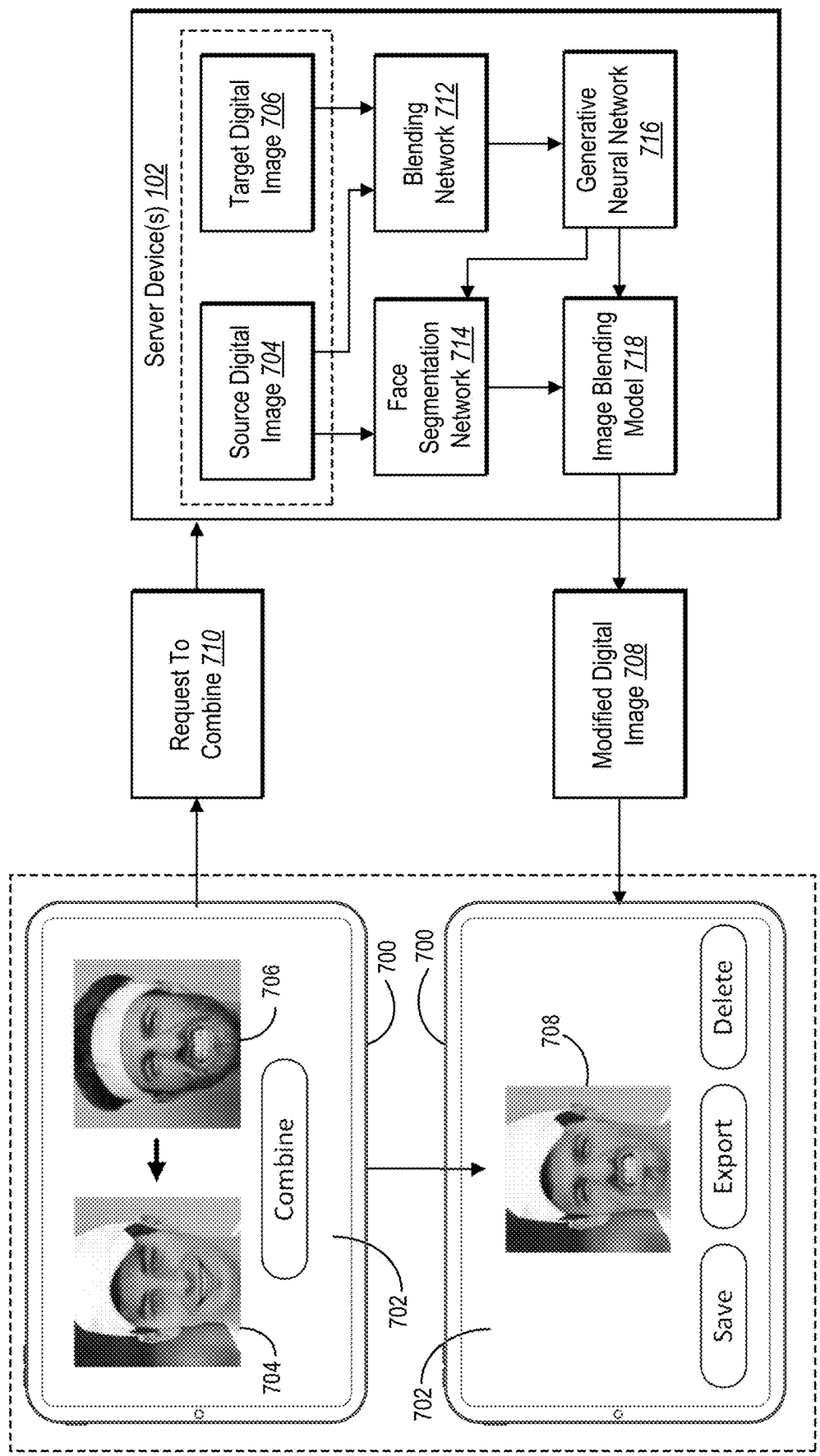
FIG. 7 illustrates a face swapping system combining digital images and displaying a combined digital image within a graphical user interface in accordance with one or more embodiments.

As previously mentioned, in some embodiments, the face swapping system 106 receives a request to combine digital images and generates a modified digital image (i.e., a combined or blended digital image according to one or more embodiments disclosed herein). For instance, FIG. 7 illustrates the face swapping system 106 receiving a request to combine a source digital image and a target digital image and generating a modified digital image in accordance with one or more embodiments. Indeed, FIG. 7 illustrates the face swapping system 106 utilizing digital images from a client device to generate a modified digital image on a server device prior to providing the modified digital image on the client device.

For example, as shown in FIG. 7, the face swapping system 106 receives a request to combine 710 a source digital image 704 and a target digital image 706 displayed on a graphical user interface 702 of a client device 700 (e.g., operating an image modification application). The face swapping system 106 (implemented on the server device(s) 102) utilizes the source digital image 704 and the target digital image 706 from the request to combine 710 to generate a modified digital image 708 having facial features of the target digital image 706 transferred to the source digital image 704. As illustrated, the face swapping system 106 uses a blending network 712 to combine the source digital image 704 and the target digital image 706. The face swapping system 106 uses a generative neural network 716 to generate a combined digital image. The face swapping system 106 uses a face segmentation network 714 to determine an intersection face mask from the source digital image 704 and the combined digital image generated by the generative neural network 716. The face swapping system 106 uses an image blending model 718 to combine the source digital image 704 and the combined digital image based on the intersection face to generate a modified digital image 708. Subsequently, the face swapping system 106 provides the modified (i.e., blended) digital image 708 for display on the graphical user interface 702 of the client device 700.

To further illustrate, FIGS. 8A-10B show experimental results of a face swapping system 106 utilizing various elements of the disclosed embodiments to generated modified digital images (i.e., combined digital images or blended digital images). For instance, FIG. 8A shows multiple results of transferring facial features from target digital image 804 to source digital image 802 to generate a modified digital image. The modified digital image 806 is an example of a modified digital image generated using a conventional face-transferring method known as Reface (https://hey-.reface.ai/). The modified digital image 808 is an example of a modified digital image generated using the face swapping system 106 according to one or more embodiments disclosed herein. Indeed, as shown in FIG. 8A, the modified digital image 808 (generated using methods disclosed herein) exhibits a higher fidelity and resolution in comparison to the modified digital image 806 (generated using conventional methods). In particular, implementations of the face swapping system 106 correctly preserve the outline of the original face as well as background and hair details leading to better blending results and an overall higher quality.

Similarly, FIG. 8B shows multiple results of transferring facial features from target digital image 814 to source digital image 812 to generate a modified digital image. The modified digital image 816 is another example of a modified digital image generated using the conventional image-combining methods known as Reface. The modified digital image 818 is an example of a modified digital image generated using the face swapping system 106 according to one or more embodiments disclosed herein. As shown in FIG. 8B, the modified digital image 818 (generated using methods disclosed herein) exhibits a higher fidelity and resolution in comparison to the modified digital image 816 (generated using conventional methods). In particular, implementations of the face swapping system 106 results in more detailed face images (e.g., facial hair and wrinkles) and results in better identity transfers.

Figure 9A:
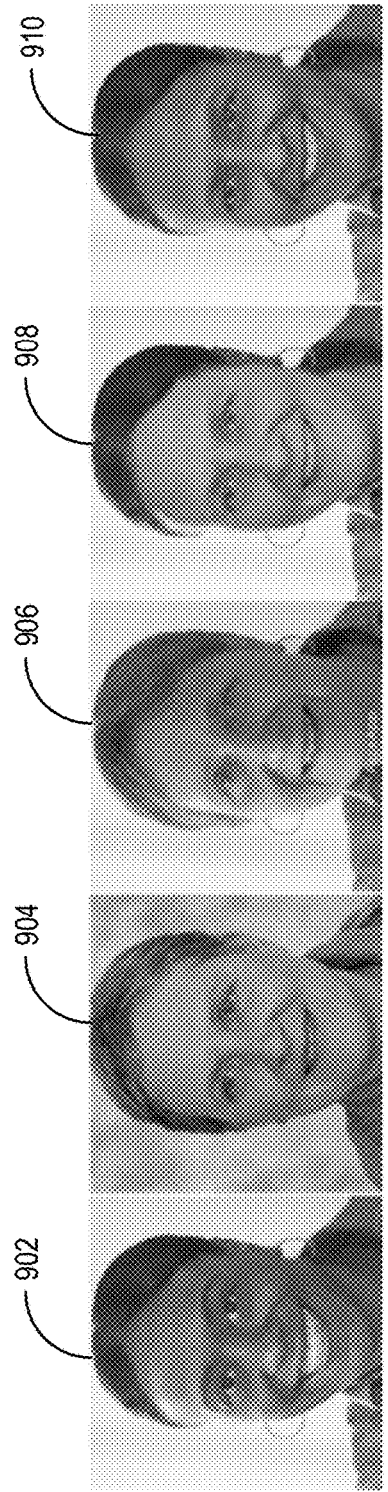
FIGS. 9A-9B illustrate experimental results of a face swapping system utilizing a loss function to reduce a texture loss in accordance with one or more embodiments.
Figure 9B:
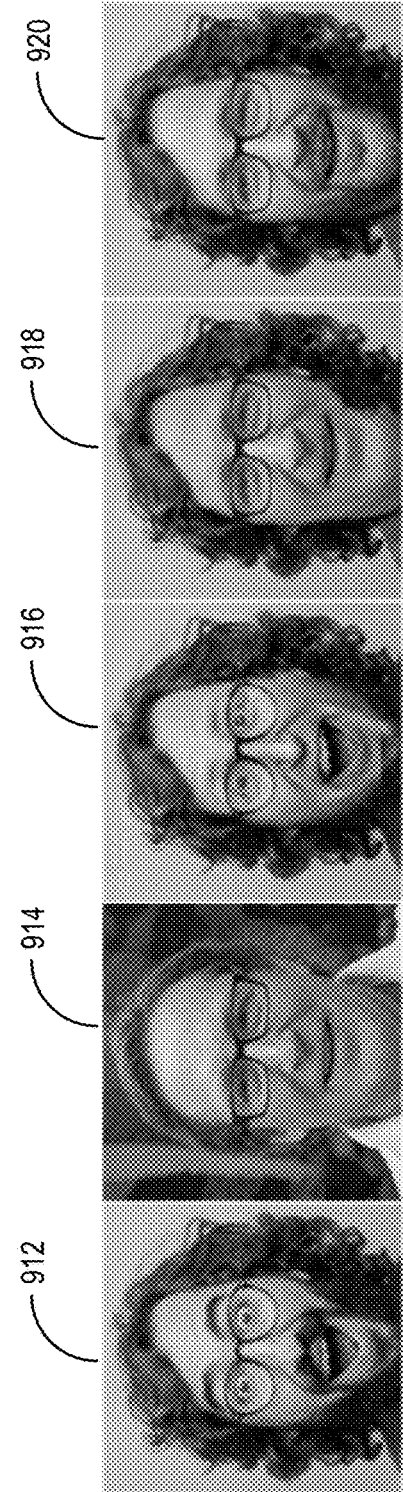

Additionally, FIGS. 9A-9B show multiple results of transferring facial features between source and target digital images. For instance, FIG. 9A shows examples of modified digital images generated by various methods to transfer facial features from a target digital image 904 to a source digital image 902. Specifically, modified digital image 906 is an example of a modified digital image generated by conventional face-transferring methods known as FaceApp. The modified digital image 908 is an example of a modified digital image generated using a blending network of a face swapping system 106 according to one or more embodiments (without using a texture loss function as discussed above in relation to FIG. 4). The modified digital image 910 is an example of a modified digital image generated using a blending network of a face swapping system 106 according to one or more embodiments (including the texture loss function as described herein). Indeed, as shown in FIG. 9A, the modified digital images 908, 910 (generated using methods disclosed herein) exhibit higher fidelity to the source digital image 902 in comparison to the modified digital image 906 (generated using conventional methods) specifically by maintaining the skin tone of the source digital image 902. Similarly, the modified digital image 910 (generated using a texture loss function as described herein) exhibits further increased fidelity to the source digital image 902, particularly with respect to the skin tone of the depicted subject.

Similarly, FIG. 9B shows examples of modified digital images generated by various methods to transfer facial features from a target digital image 914 to a source digital image 912. Specifically, modified digital image 916 is an example of a modified digital image generated by conventional face-transferring method known as Reface. The modified digital image 918 is an example of a modified digital image generated using a blending network of a face swapping system 106 according to one or more embodiments (without using a texture loss function as discussed above in relation to FIG. 4). The modified digital image 920 is an example of a modified digital image generated using a blending network of a face swapping system 106 according to one or more embodiments (including the texture loss function as described herein). Indeed, as shown in FIG. 9B, the modified digital images 918, 920 (generated using methods disclosed herein) exhibit higher fidelity to the source digital image 912 in comparison to the modified digital image 916 (generated using conventional methods) specifically by maintaining the facial hairstyle of the source digital image 912. The modified digital image 920 (generated using a texture loss function as described herein) exhibits further increased fidelity to the source digital image 912, particularly with respect to the facial hair of the depicted subject.

Figure 10A:
FIGS. 10A-10B illustrate experimental results of a face swapping system utilizing a multi-band blending model in accordance with one or more embodiments.
Figure 10B:
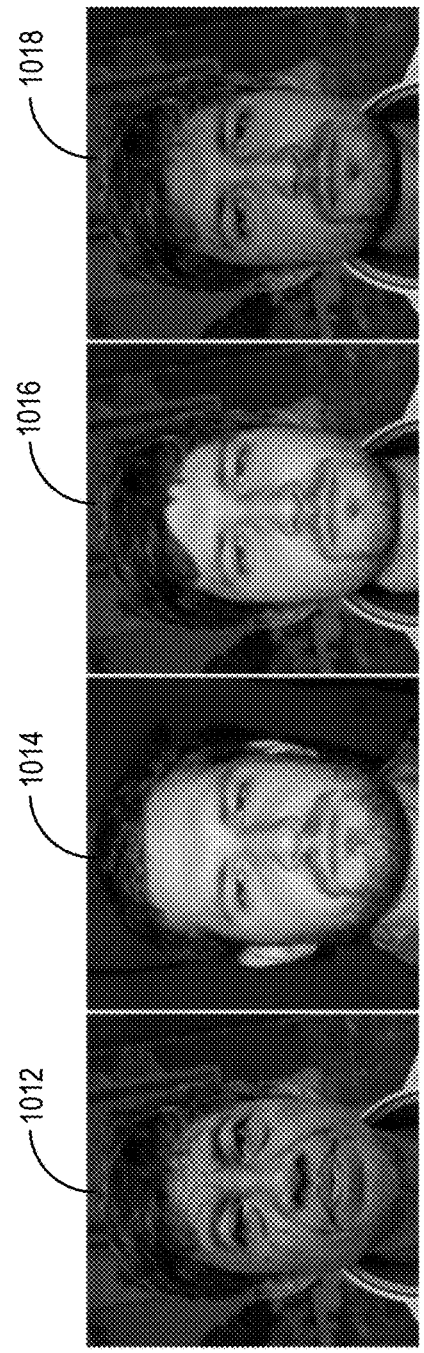

Moreover, FIGS. 10A-10B show multiple results of transferring facial features between source and target digital images utilizing multi-band blending models to combine digital images. For instance, FIG. 10A shows examples of modified digital images generated using multi-band blending models to transfer facial features from a target digital image 1004 to a source digital image 1002. The modified digital image 1006 is an example of a modified digital image generated using a conventional multi-band blending model (e.g., a conventional Laplacian blending model). The modified digital image 1008 is an example of a modified digital image generated using a multi-band blending model according to one or more embodiments disclosed herein (as discussed above, for example, in relation to FIG. 6). Indeed, as shown in FIG. 10A, the modified digital image 1008 (generated using methods disclosed herein) exhibits higher fidelity to the source digital image 1002 in comparison to the modified digital image 1006 (generated using convention blending methods) by adjusting the skin tone towards the source image.

Similarly, FIG. 10B shows examples of modified digital images generated using multi-band blending models to transfer facial features from a target digital image 1014 to a source digital image 1012. The modified digital image 1016 is an example of a modified digital image generated using a conventional multi-band blending model (e.g., a conventional Laplacian blending model). The modified digital image 1018 is an example of a modified digital image generated using a multi-band blending model according to one or more embodiments disclosed herein (as discussed above, for example, in relation to FIG. 6). Indeed, as shown in FIG. 10B, the modified digital image 1018 (generated using methods disclosed herein) exhibits higher fidelity to the source digital image 1012 in comparison to the modified digital image 1016 (generated using convention blending methods) by adjusting the skin tone towards the source image.

Figure 11:
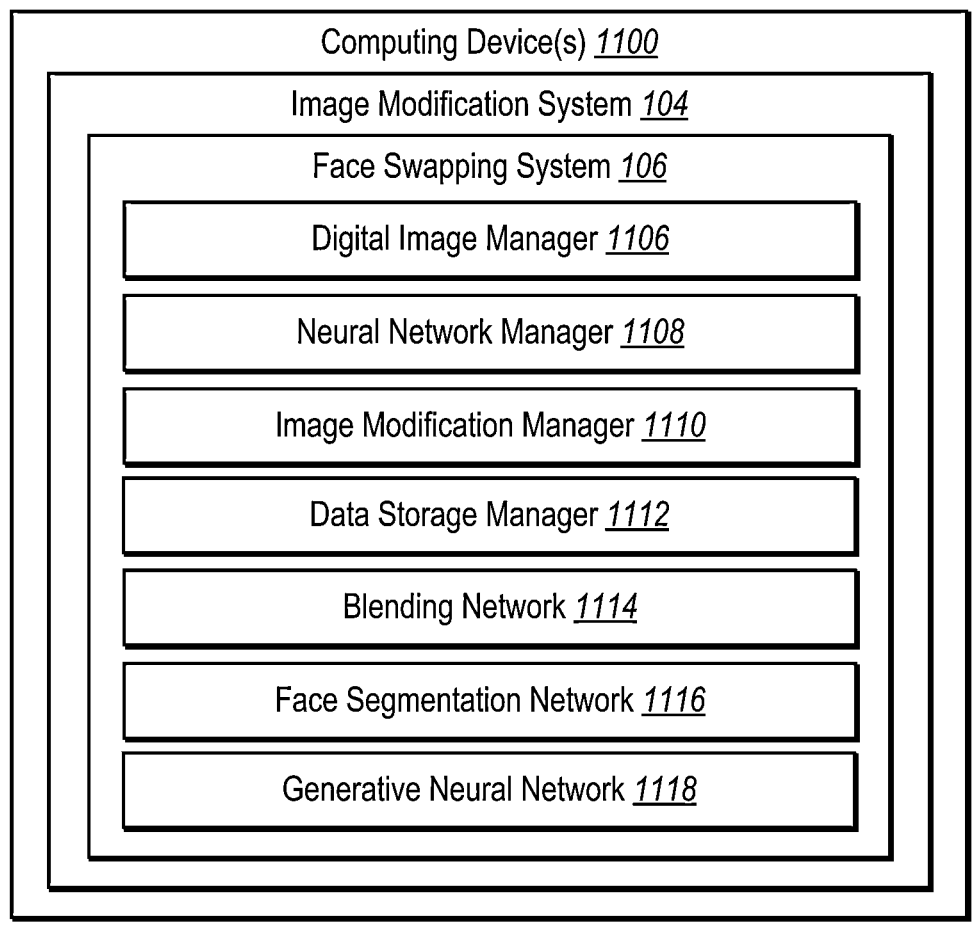
FIG. 11 illustrates a schematic diagram of a face swapping system in accordance with one or more embodiments.

Turning now to FIG. 11, additional detail will be provided regarding components and capabilities of one or more embodiments of the face swapping system 106. In particular, FIG. 11 illustrates an example face swapping system 106 executed by a computing device 1100 (e.g., the server devices(s) 102 or the client device 110). As shown by the embodiment of FIG. 11, the computing device 1100 includes or hosts an image modification system 104 and the face swapping system 106. Furthermore, as shown in FIG. 11, the face swapping system 106 includes a digital image manager 1106, a generative neural network manager 1108, an image modification manager 1110, a data storage manager 1112, a blending network 1114, a face segmentation network 1116, and a generative neural network 1118.

As just mentioned, and as illustrated in the embodiment of FIG. 11, the face swapping system 106 includes the digital image manager 1106. For instance, the digital image manager 1106 identifies, stores, transmits, and/or displays digital images (and/or digital videos) as described above (e.g., in relation to FIGS. 1-3 and 7). In some instances, the digital image manager 1106 stores digital images with corresponding latent code/vectors pre-embedded in latent space using an encoder as described above (e.g., in relation to FIGS. 4-5).

Furthermore, as shown in FIG. 11, the face swapping system 106 includes the neural network manager 1108. For instance, the neural network manager 1108 manages the various neural networks described herein, such as the blending network 1114 (e.g., as described above in relation to FIGS. 1-4), the face segmentation network 1116 (e.g., as described above in relation to FIG. 5), and the generative neural network 1118 (e.g., as described above in relation to FIGS. 1-4).

In addition, as shown in FIG. 11, the face swapping system 106 includes the image modification manager 1110. For instance, the image modification manager 1110 combines the latent codes of a source digital image and a target digital image using a blending network and generates a modified digital image (i.e., a combined digital image or blended digital image) as described above (e.g., in relation to FIGS. 2 and 4-6).

As also shown in FIG. 11, the face swapping system 106 includes the data storage manager 1112. In some embodiments, the data storage manager 1112 is implemented by one or more memory devices. Additionally, in certain instances, the data storage manager 1112 maintains data to perform one or more functions of the face swapping system 106. For example, the data storage manager 1112 includes digital images, latent code and/or neural network components (e.g., neural network parameters, neural network channel weights, GAN data, GAN parameters) of the blending network 1114, the face segmentation network 1116, and/or the generative neural network 1118.

Each of the components 1106-1118 of the face swapping system 106 can include software, hardware, or both. For example, the components 1106-1118 can include one or more instructions stored on a computer-readable storage medium and executable by processors of one or more computing devices, such as a client device or server device. When executed by the one or more processors, the computer-executable instructions of the face swapping system 106 can cause the computing device(s) 1100 to perform the methods described herein. Alternatively, the components 1106-1118 can include hardware, such as a special-purpose processing device to perform a certain function or group of functions. Alternatively, the components 1106-1118 of the face swapping system 106 can include a combination of computer-executable instructions and hardware.

Furthermore, the components 1106-1118 of the face swapping system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1106-1118 may be implemented as a stand-alone application, such as a desktop or mobile application. Furthermore, the components 1106-1118 may be implemented as one or more web-based applications hosted on a remote server. The components 1106-1118 may also be implemented in a suite of mobile device applications or "apps." To illustrate, the components 1106-1118 may be implemented in an application, including but not limited to, ADOBE PHOTOSHOP, ADOBE PREMIERE, ADOBE LIGHTROOM, ADOBE ILLUSTRATOR, ADOBE CREATIVE CLOUD, or ADOBE STOCK. "ADOBE," "ADOBE PHOTOSHOP," "ADOBE PREMIERE," "ADOBE LIGHTROOM," "ADOBE ILLUSTRATOR," "ADOBE CREATIVE CLOUD," and "ADOBE STOCK" are either registered trademarks or trademarks of Adobe Systems Incorporated in the United States and/or other countries.

Figure 12:
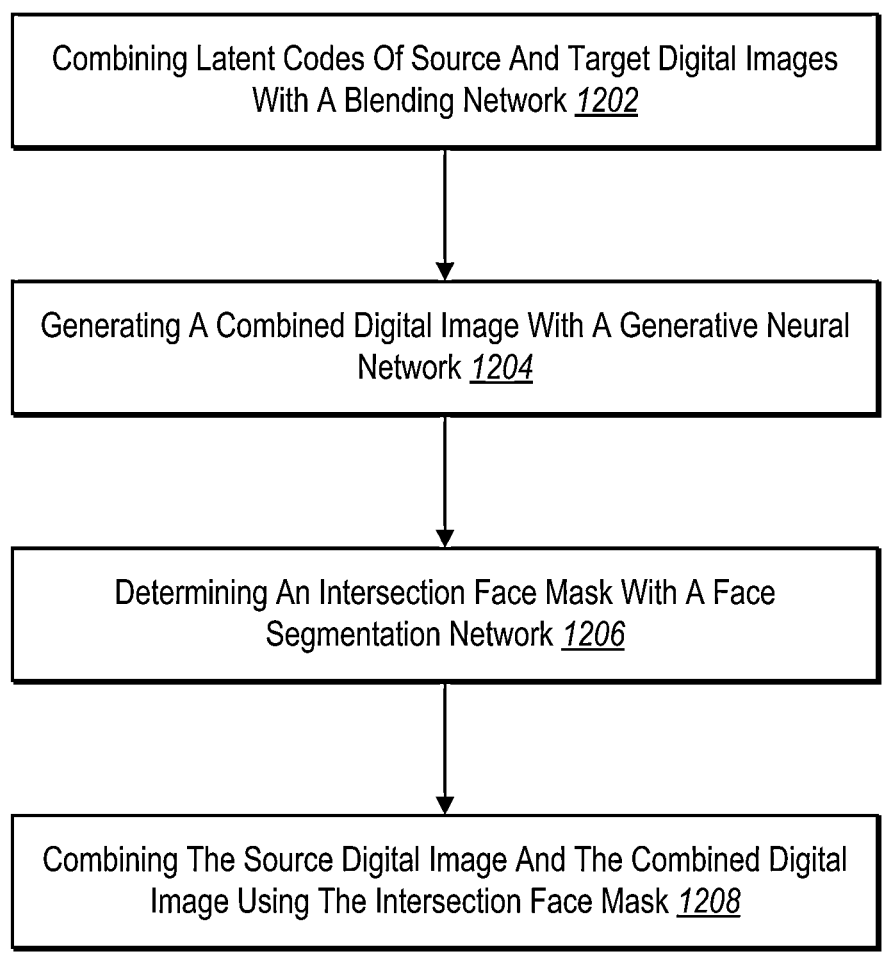
FIG. 12 illustrates a flowchart of a series of acts for generating a blended digital image utilizing a face swapping system in accordance with one or more embodiments.

FIGS. 1-11, the corresponding text, and the examples provide a number of different methods, systems, devices, and non-transitory computer-readable media of the face swapping system 106. In addition to the foregoing, one or more embodiments can also be described in terms of flowcharts comprising acts for accomplishing a particular result, as shown in FIG. 12. The acts shown in FIG. 12 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 12. In some embodiments, a system can be configured to perform the acts of FIG. 12. Alternatively, the acts of FIG. 12 can be performed as part of a computer-implemented method.

As mentioned above, FIG. 12 illustrates a flowchart of a series of acts 1200 for generating a modified digital image (i.e., a combined digital image or a blended digital image) in accordance with one or more embodiments. While FIG. 12 illustrates acts according to one embodiment, alternative embodiments may omit, add to, reorder, and/or modify any acts shown in FIG. 12.

As shown in FIG. 12, the series of acts 1200 includes an act 1202 of combining latent codes of source and target images with a blending network. In particular, in one or more embodiments, the act 1202 includes combining latent codes of a source digital image and a target digital image utilizing a blending network to determine a combined latent encoding. In some embodiments, the act 1202 includes combining a series of source latent vectors with a series of target latent vectors to determine a series of combined latent vectors. Moreover, in some embodiments, the act 1202 includes combining the latent codes utilizing a given independent layer of the blending network to combine a given source latent vector of the series of source latent vectors with a corresponding target latent vector of the series of target latent vectors. Furthermore, the act 1202 includes, in some embodiments, determining an interpolation factor for each source latent vector and each corresponding target latent vector utilizing the independent layers of the blending network and combining each source latent vector with each corresponding target latent vector utilizing each corresponding interpolation factor to determine the series of combined latent vectors.

Further still, in some embodiments, the act 1202 includes generating a series of source latent vectors corresponding to the source digital image and a series of target latent vectors corresponding to the target digital image utilizing a learned encoder. The act 1202 also includes determining a series of interpolation factors for the series of source latent vectors and the series of target latent vectors utilizing the blending network. The act 1202 also includes combining the series of source latent vectors with the series of target latent vectors utilizing the series of interpolation factor to determine a series of combined latent vectors. Also, in one or more embodiments, the act 1202 includes combining a series of source latent vectors with a series of target latent vectors utilizing a series of independent layers of the blending network to generate the combined latent encoding. In such implementations, each independent layer of the blending network utilizes independent learned parameters to reduce one or more losses associated with combination of the source digital image and the target digital image.

In some embodiments, the act 1202 includes utilizing a blending network wherein each independent layer of a series of independent layers of the blending network comprises a plurality of linear layers. Moreover, in one or more embodiments, the act 1202 includes training the blending network to iteratively adjust one or more parameters based on one or more loss functions corresponding to at least one of the source digital image, the target digital image, or the combined latent vectors. Further, in some embodiments, the act 1202 includes independently adjusting the one or more parameters for each of the series of independent layers of the blending network. Additionally, in some embodiments, the act 1202 includes utilizing one or more loss functions to train the blending network, wherein at least one of the one or more loss functions is configured to reduce a texture loss between the source digital image and the combined digital image.

As shown in FIG. 12, the series of acts 1200 includes an act 1204 of generating a combined digital image with a generative neural network. For example, in some embodiments, the act 1204 includes generating a combined digital image from the combined latent encoding utilizing a generative neural network. In some embodiments, the act 1204 includes generating a combined digital image from a series of combined latent vectors utilizing the generative neural network.

As shown in FIG. 12, the series of acts 1200 includes an act 1206 of determining an intersection face mask with a face segmentation network. For instance, in one or more embodiments, the act 1206 includes determining a source face mask corresponding to the source digital image utilizing the face segmentation network, determining a combined face mask corresponding to the combined digital image utilizing the face segmentation network, and comparing the source face mask and the combined face mask to determine the intersection face mask.

As shown in FIG. 12, the series of acts 1200 includes an act 1208 of combining the source digital image and the combined digital image using the intersection face mask. For, example, in some embodiments, the act 1208 includes determining an intersection face mask between the source digital image and the combined digital image utilizing a face segmentation network and combining the source digital image and the combined digital image utilizing the intersection face mask to generate a blended digital image. In some embodiments, the act 1208 includes combining the source digital image and the combined digital image utilizing a multi-band blending model to combine facial details of the combined digital image with background details of the source digital image (e.g., using the intersection face mask). Further, in some embodiments, the act 1208 includes utilizing a first subset of blending layers of the multi-band blending model to preserve one or more characteristics of the source digital image and utilizing a second subset of blending layers of the multi-band blending model to combine the characteristics of the source digital image and one or more characteristics of the combined digital image based on the intersection face mask. Additionally, in one or more embodiments, the act 1208 includes utilizing a global contrast factor to transfer lighting characteristics from the source digital image to the blended digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
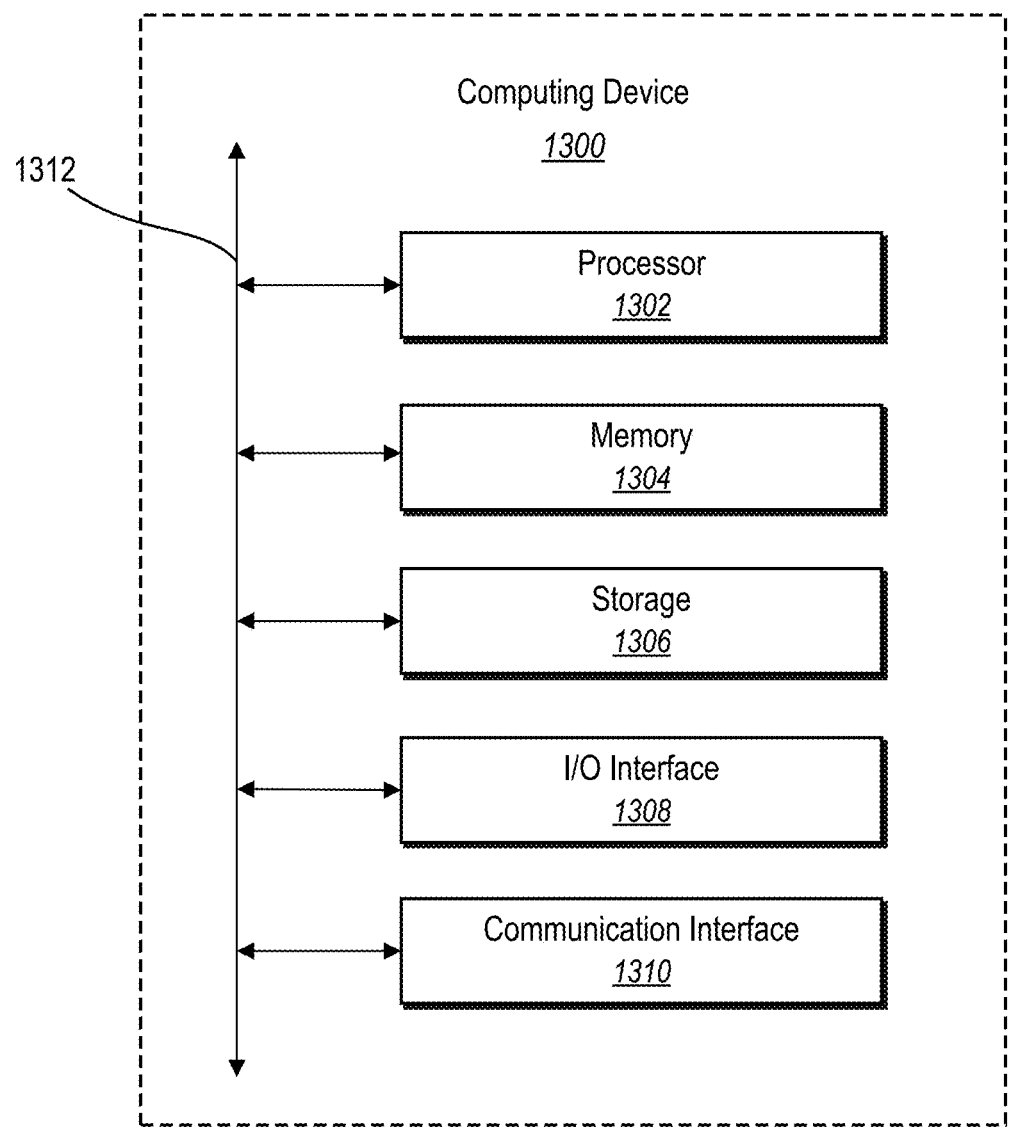
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., server device(s) 102, client devices 110, 700 and computing device(s) 1100). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   combining latent codes of a source digital image and a target digital image utilizing a blending network to determine a combined latent encoding;
   generating a combined digital image from the combined latent encoding utilizing a generative neural network;
   determining an intersection face mask between the source digital image and the combined digital image utilizing a face segmentation network; and
   combining the source digital image and the combined digital image utilizing the intersection face mask to generate a blended digital image.

2. The computer-implemented method of claim 1, wherein combining the latent codes comprises combining a series of source latent vectors with a series of target latent vectors to determine a series of combined latent vectors.

3. The computer-implemented method of claim 2, wherein combining the latent codes comprises utilizing a given independent layer of the blending network to combine a given source latent vector of the series of source latent vectors with a corresponding target latent vector of the series of target latent vectors.

4. The computer-implemented method of claim 3, further comprising:
   determining an interpolation factor for each source latent vector and each corresponding target latent vector utilizing independent layers of the blending network; and
   combining each source latent vector with each corresponding target latent vector utilizing each corresponding interpolation factor to determine the series of combined latent vectors.

5. The computer-implemented method of claim 1, wherein determining the intersection face mask comprises:
   determining a source face mask corresponding to the source digital image utilizing the face segmentation network;
   determining a combined face mask corresponding to the combined digital image utilizing the face segmentation network; and
   comparing the source face mask and the combined face mask to determine the intersection face mask.

6. The computer-implemented method of claim 1, wherein combining the source digital image and the combined digital image comprises utilizing multi-band blending model to combine facial details of the combined digital image with background details of the source digital image.

7. The computer-implemented method of claim 6, wherein combining the source digital image and the combined digital image comprises:
- utilizing a first subset of blending layers of the multi-band blending model to preserve one or more characteristics of the source digital image; and
- utilizing a second subset of blending layers of the multi-band blending model to combine the one or more characteristics of the source digital image and one or more characteristics of the combined digital image based on the intersection face mask.

8. The computer-implemented method of claim 6, wherein combining the source digital image and the combined digital image further comprises utilizing a global contrast factor to transfer lighting characteristics from the source digital image to the blended digital image.

9. A non-transitory computer-readable medium storing instructions thereon that, when executed by at least one processor, cause the at least one processor to perform operations comprising:
- combining latent codes of a source digital image and a target digital image utilizing a blending network to generate a combined latent encoding;
- generating a combined digital image from the combined latent encoding utilizing a generative neural network;
- determining a source face mask corresponding to the source digital image utilizing a face segmentation network;
- determining a combined face mask corresponding to the combined digital image utilizing the face segmentation network;
- comparing the source face mask and the combined face mask to determine an intersection face mask; and
- combining the source digital image and the combined digital image utilizing the intersection face mask to generate a blended digital image.

10. The non-transitory computer-readable medium of claim 9, wherein combining the latent codes of the source digital image and the target digital image comprises:
- generating a series of source latent vectors corresponding to the source digital image and a series of target latent vectors corresponding to the target digital image utilizing a learned encoder;
- determining a series of interpolation factors for the series of source latent vectors and the series of target latent vectors utilizing the blending network; and
- combining the series of source latent vectors with the series of target latent vectors utilizing the series of interpolation factor to determine a series of combined latent vectors.

11. The non-transitory computer-readable medium of claim 9, wherein combining the latent codes of the source digital image and the target digital image comprises combining a series of source latent vectors with a series of target latent vectors utilizing a series of independent layers of the blending network to generate the combined latent encoding.

12. The non-transitory computer-readable medium of claim of claim 11, wherein each independent layer of the blending network utilizes independent learned parameters to reduce one or more losses associated with combination of the source digital image and the target digital image.

13. A system comprising:
- one or more memory devices comprising: a source digital image, a target digital image, a blending network, a face segmentation network, and a generative neural network; and
- one or more processors configured to cause the system to:
  - determine a series of interpolation factors for a series of source latent vectors corresponding to the source digital image and a series of target latent vectors corresponding to the target digital image utilizing a series of independent layers of the blending network;
  - combine the series of source latent vectors and the series of target latent vectors utilizing the series of interpolation factors to determine a series of combined latent vectors;
  - generate a combined digital image from the series of combined latent vectors utilizing the generative neural network;
  - determine an intersection face mask between the source digital image and the combined digital image utilizing the face segmentation network; and
  - combine the source digital image and the combined digital image utilizing the intersection face mask to generate a blended digital image.

14. The system of claim 13, wherein the one or more memory devices further comprise a learned encoder and the one or more processors are further configured to cause the system to generate the series of source latent vectors and the series of target latent vectors utilizing the learned encoder.

15. The system of claim 13, wherein each independent layer of the series of independent layers comprises a plurality of linear layers.

16. The system of claim 13, wherein the one or more processors are further configured to cause the system to train the blending network to iteratively adjust one or more parameters based on one or more loss functions corresponding to at least one of the source digital image, the target digital image, or the combined latent vectors.

17. The system of claim 16, wherein training the blending network comprises independently adjusting the one or more parameters for each of the series of independent layers.

18. The system of claim 16, wherein the one or more processors are further configured to cause the system to utilize at least one of the one or more loss functions is configured to reduce a texture loss between the source digital image and the combined digital image.

19. The system of claim 13, wherein the one or more processors are further configured to cause the system to:
- determine a source face mask corresponding to the source digital image utilizing the face segmentation network;
- determine a combined face mask corresponding to the combined digital image utilizing the face segmentation network; and
- compare the source face mask and the combined face mask to determine the intersection face mask.

20. The system of claim 13, wherein combining the source digital image and the combined digital image comprises utilizing multi-band blending model to combine facial details of the combined digital image with background details of the source digital image using the intersection face mask.

* * * * *